(12) United States Patent
Wellisz et al.

(10) Patent No.: US 6,512,348 B1
(45) Date of Patent: Jan. 28, 2003

(54) BATTERY ALIGNER INSERTION APPARATUS AND METHOD

(75) Inventors: Tadeusz Z. Wellisz, Los Angeles, CA (US); Cin K. Abidin, Los Angeles, CA (US)

(73) Assignee: Bioplate, Inc., Los Angeles, CA (US)

( * ) Notice: Subject to any disclaimer, the term of this patent is extended or adjusted under 35 U.S.C. 154(b) by 0 days.

(21) Appl. No.: 09/995,446

(22) Filed: Nov. 29, 2001

(51) Int. Cl.[7] .................................................. H02J 7/00
(52) U.S. Cl. ........................................ 320/107; 429/100
(58) Field of Search ................................ 320/107, 112, 320/114; 429/99, 100

(56) References Cited

U.S. PATENT DOCUMENTS

| | | |
|---|---|---|
| 4,050,528 A | 9/1977 | Foltz et al. |
| 4,091,880 A | 5/1978 | Troutner et al. |
| 5,187,422 A | 2/1993 | Izenbaard et al. |
| 5,368,954 A | 11/1994 | Bruns |
| 5,863,218 A | 1/1999 | Quat et al. |
| 6,059,806 A | 5/2000 | Hoegerle |
| 6,120,932 A | 9/2000 | Slipy et al. |

*Primary Examiner*—Gregory J. Toatley, Jr.
(74) *Attorney, Agent, or Firm*—William W. Haefliger

(57) ABSTRACT

The method of installing a cluster of batteries in a power supply receptacle, that includes providing a funnel having a guide opening to receive and guide angularly oriented displacement of the cluster of batteries relative to the funnel, placing the funnel guide opening into registration with the power supply receptacle, and installing the oriented cluster of batteries through the funnel guide opening and into the receptacle.

39 Claims, 6 Drawing Sheets

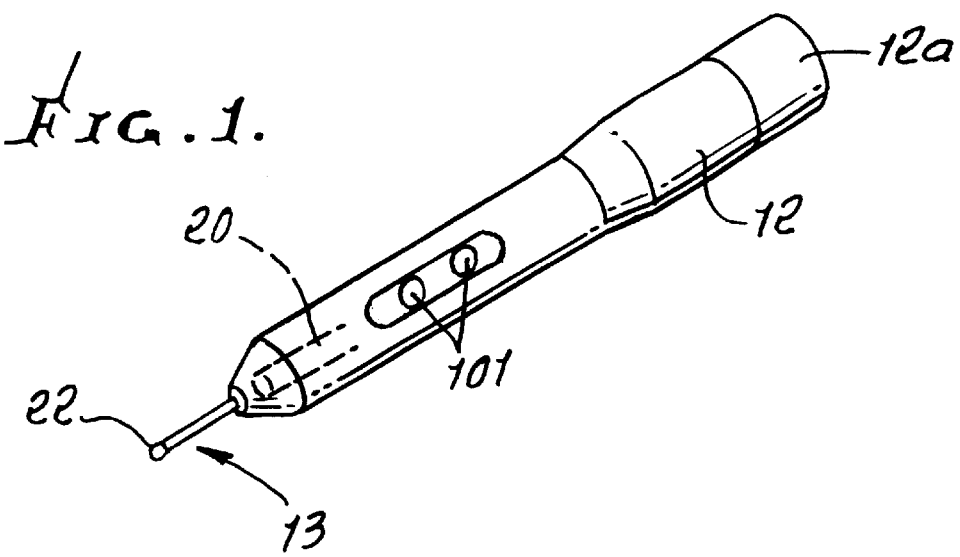
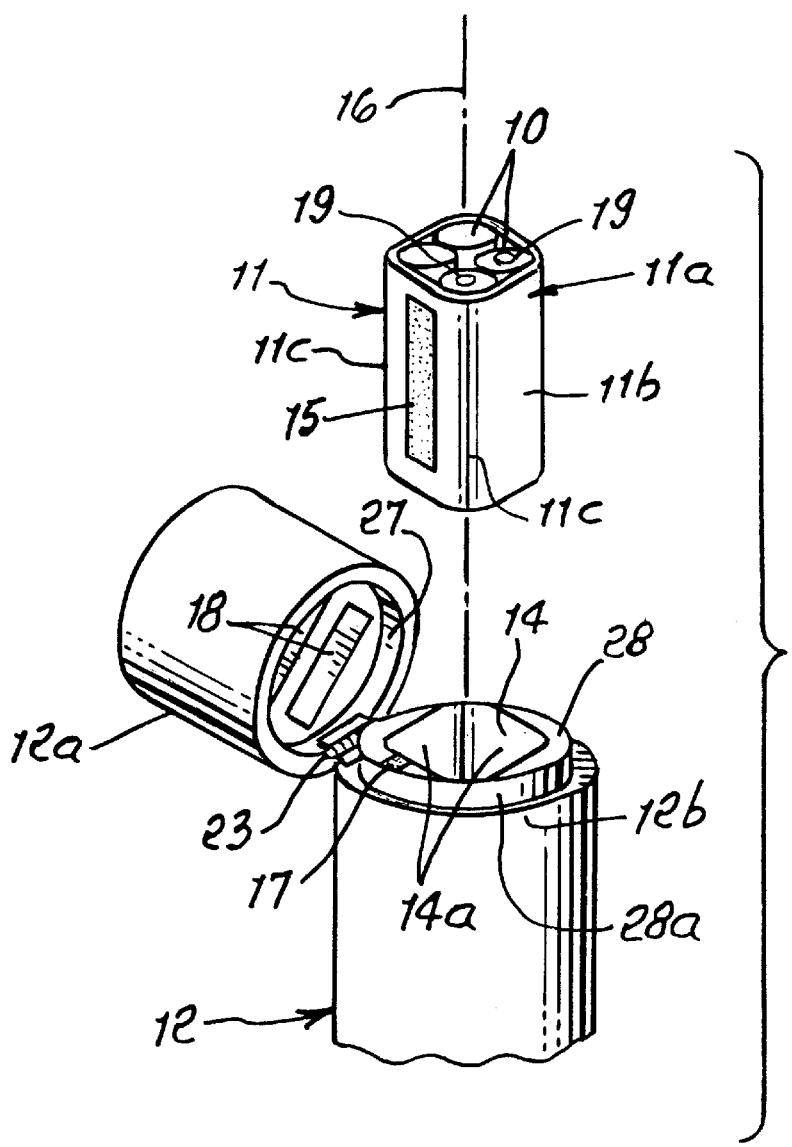

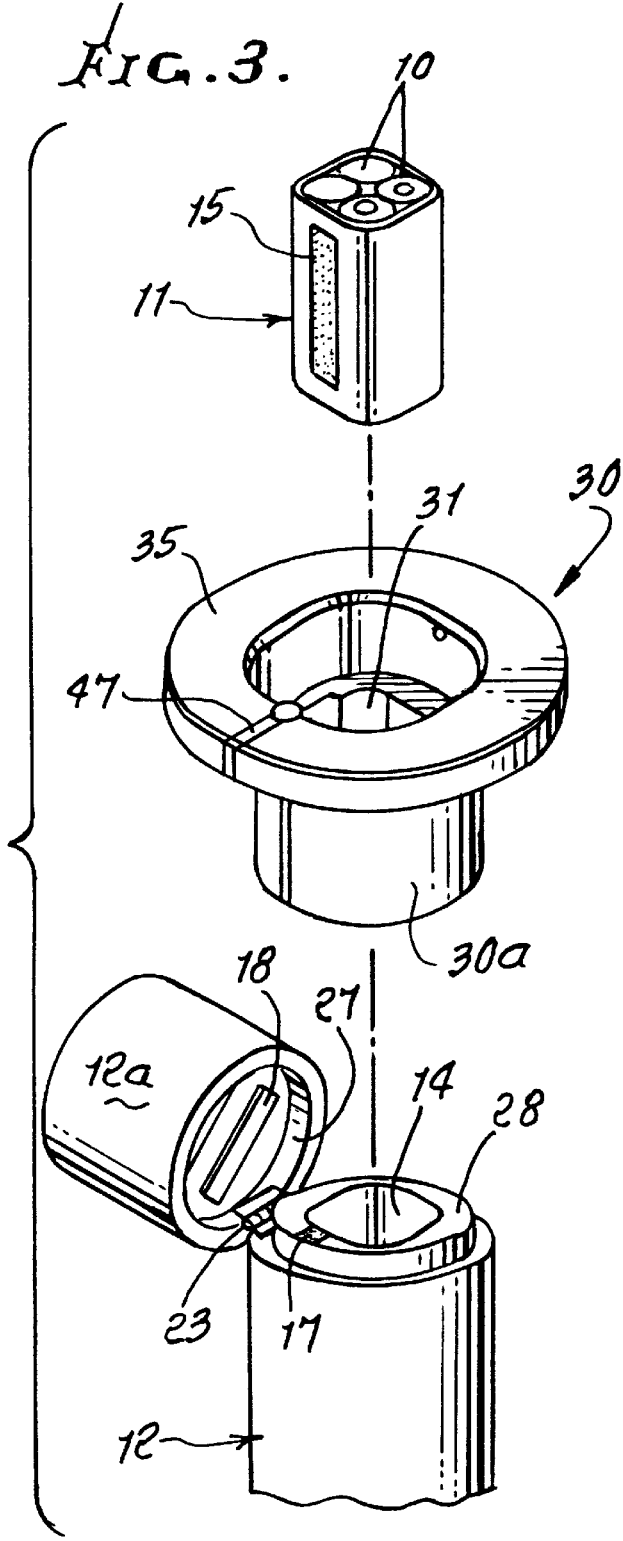
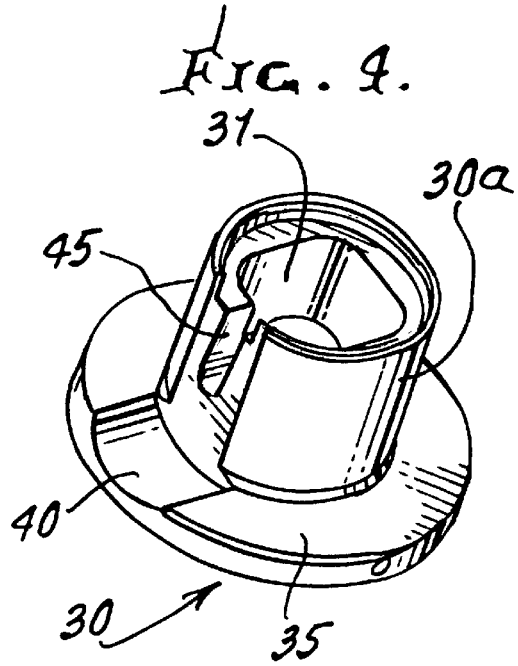
Fig. 3.
Fig. 4.

BATTERY ALIGNER INSERTION APPARATUS AND METHOD

BACKGROUND OF THE INVENTION

This invention relates generally to assembly of multiple batteries into power supply receptacles; and more particularly packs of side-by-side dry cell type batteries into such receptacles.

Problems presented by such assembly include maintenance of battery polarity orientation; orientation of side-by-side multiple batteries with respect to terminals in the receptacle to be engaged by the batteries; difficulty of one-by-one battery insertions where the batteries are to be closely packed in the receptacle; and problems with maintaining sterility, during insertion of non-sterile batteries into sterile devices such as power supply receptacles, without contaminating the exteriors of such devices. There is need for improvements in apparatus and method enabling efficient, rapid assembly of battery packs into such receptacles. There is a particular need for such improvements wherein the receptacle is associated with a surgical tool such as a rotary screwdriver.

SUMMARY OF THE INVENTION

It is a major object of the invention to provide methods and apparatus meeting the above needs.

Basically, one form of the invention provides an improved method of installing a cluster of dry cell type batteries into a power supply receptacle, and includes the steps:

a) providing a funnel having a guide opening to receive and guide angularly oriented displacement of the cluster of batteries relative to the funnel, b) placing the funnel guide opening into registration with the power supply receptacle, c) and installing the oriented cluster of batteries through the funnel guide opening and into the receptacle.

This procedure enables insertion of nonsterile batteries into sterile devices or receptacles without contaminating exteriors of such devices.

It is another object to provide a manually angularly orientable flange on the funnel to extend about the opening and move into proximity to an element associated with the receptacle, enabling angularly oriented battery cluster installation.

A further object is to provide a battery cluster carrier cap, endwise interfitting the cluster of batteries and the cap, interfitting the cap and the funnel so that the batteries are in alignment with said funnel guide opening, and allowing displacement of the cluster of batteries endwise from the cap for installation into the receptacle via the guide opening.

An additional object is to provide first structure within the cap to position the batteries relative to the cap during interfitting of the cluster of batteries and the cap. That first structure is typically provided to have frictional retention means for exerting retention force sidewardly on the batteries. Also, the first structure may include a ledge within the cap to endwise engage and position at least one of the batteries in the cluster.

Another object is to provide second structure within the funnel to position the battery carrier cap relative to the funnel during interfitting of the cap and funnel. Such second structure typically may have cap guide means for guiding angularly oriented insertion of the cap into the funnel. The second structure may also include a ledge or stop to endwise engage the cap and limit its insertion into the funnel.

The receptacle is typically provided as part of a rotary tool and motor assembly and wherein the batteries supply electrical current to the motor; and such tool may comprise a surgical rotary screwdriver; and the cluster of batteries may be provided in the form of a sterile pack, receivable by the funnel.

A yet further object is to provide for angular orientation of cap relative to the funnel, and orientation of the funnel relative to the receptacle and/or a cover hinged to the receptacle. In this regard, a cover carried by the receptacle is movable into receptacle covering position, after the batteries are installed into the receptacle, and the funnel is removed, the cover hinged to the receptacle to maintain angular orientation about the receptacle axis so as to orient the funnel, when the cover is open.

An additional object is to provide a method of installing multiple batteries in a pack into a power supply receptacle, having a cover, the pack having substantially flat sides, that includes a) providing the receptacle to have a battery pack receiving recess, the recess having substantially flat sides to correspond to the pack sides, b) providing markers on the battery pack and on the receptacle, and relatively angularly orienting the markers by relatively angularly orienting the pack and receptacle, c) and endwise inserting the pack into the recess.

A yet further object is to provide a method of inserting batteries into a receptacle associated with a surgical instrument, that includes a) providing a cover for the receptacle, attached to the receptacle, the cover having an open position, b) providing a guide to assist said inserting, c) and, when the cover is open, angularly orienting the guide relative to the open cover, to angularly orient said inserting.

These and other objects and advantages of the invention, as well as the details of an illustrative embodiment, will be more full understood from the following specification and drawings in which:

DRAWING DESCRIPTION

FIG. 1 is perspective view of a rotary surgical tool, as for example a screwdriver;

FIG. 2 is an exploded perspective view of battery pack installation into a receptacle;

FIG. 3 is an exploded perspective view of battery pack installation into a receptacle, and employing a guide funnel;

FIG. 4 is an inverted perspective view of the guide funnel, seen in FIG. 3;

DETAILED DESCRIPTION

Figure 5:
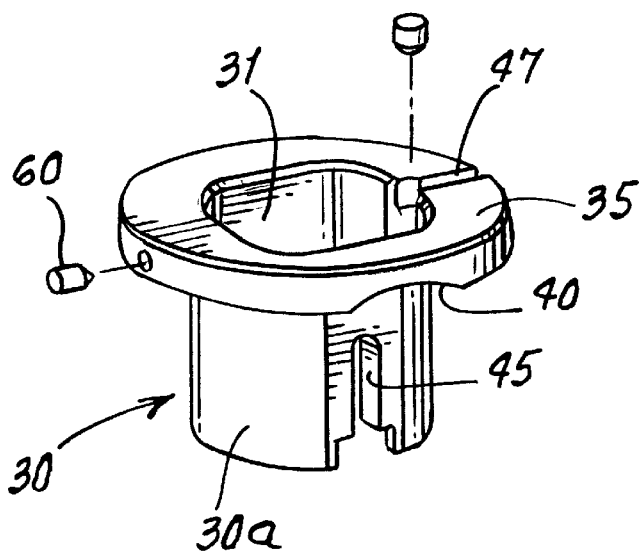
FIG. 5 is a perspective view of the FIG. 3 funnel.

The invention enables rapid, accurate installation of multiple batteries (typically) as seen at 10 in a pack 11, in FIG. 2, into a power supply receptacle 12. The latter typically has a cover or cap as at 12a.

The pack has substantially flat sides as at 11b on a wrap 11a. Four of such sides are shown, with curved corners 11c. FIG. 1 shows a surgical tool 13 carried by manually graspable receptacle 12. The cover 12a is in closed position in FIG. 1, whereas in FIG. 2 the cover is swung open.

The receptacle has a battery pack receiving recess 14, with substantially flat interior sides 14a to closely receive the pack corresponding flat sides, whereby the battery end terminals are in alignment with electrical terminals 100 in the receptacle. See also FIG. 12.

A marker such as a stripe 15 is provided on one of the pack flat sides, and the pack is angularly oriented as about an axis 16 to align with a marker 17 on the receptacle for correctly oriented battery insertion. Typically, marker 17 is spaced inwardly from the outer side 12b of the preferably cylindrical receptacle, to be covered by the cover 12a in its closed position. In that position, electrical terminals 18 in the cover engage the battery upper end terminals 19, to establish a circuit for electrical power supply to a motor 20 in the tool 13. Such a tool may comprise a screwdriver having a rotary tip 22. See also ON-OFF buttons 101, in FIG. 1. The cover lower side wall is preferably hinge connected at 23 to the receptacle 12, to correctly align terminals 18 with the battery terminal 19, to establish the circuit. Accordingly, the battery pack may be quickly correctly angularly oriented, and inserted into the receptacle, and the cover closed, to establish the circuit. The cover may have its lower bore extent 27 brought into frictional engagement with receptacle cylindrical and axially protruding outer surface 28a of a protrusion 28 to hold the cover closed, and to assist the hinge in its aligning (cover terminals to battery terminals) functioning.

Figure 6:
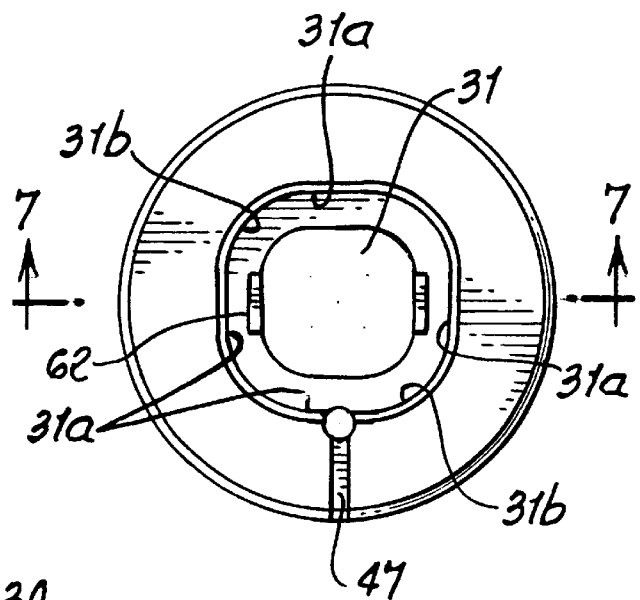
FIG. 6 is a top plan view of the funnel, as seen in FIG. 5.
Figure 7:
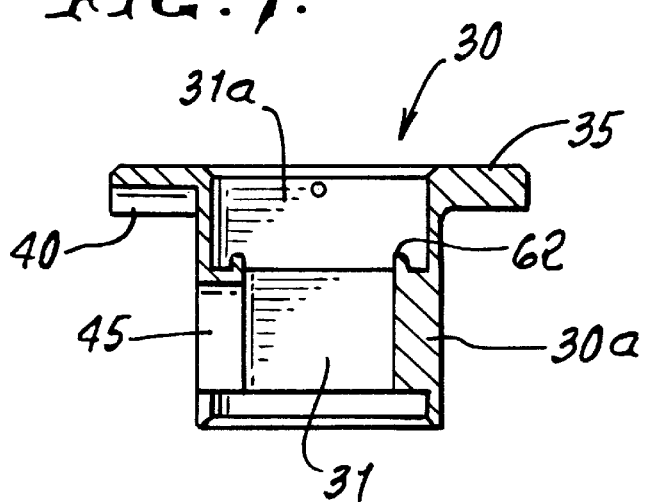
FIG. 7 is a section taken in elevation on lines 7—7 of FIG. 6.
Figure 12:
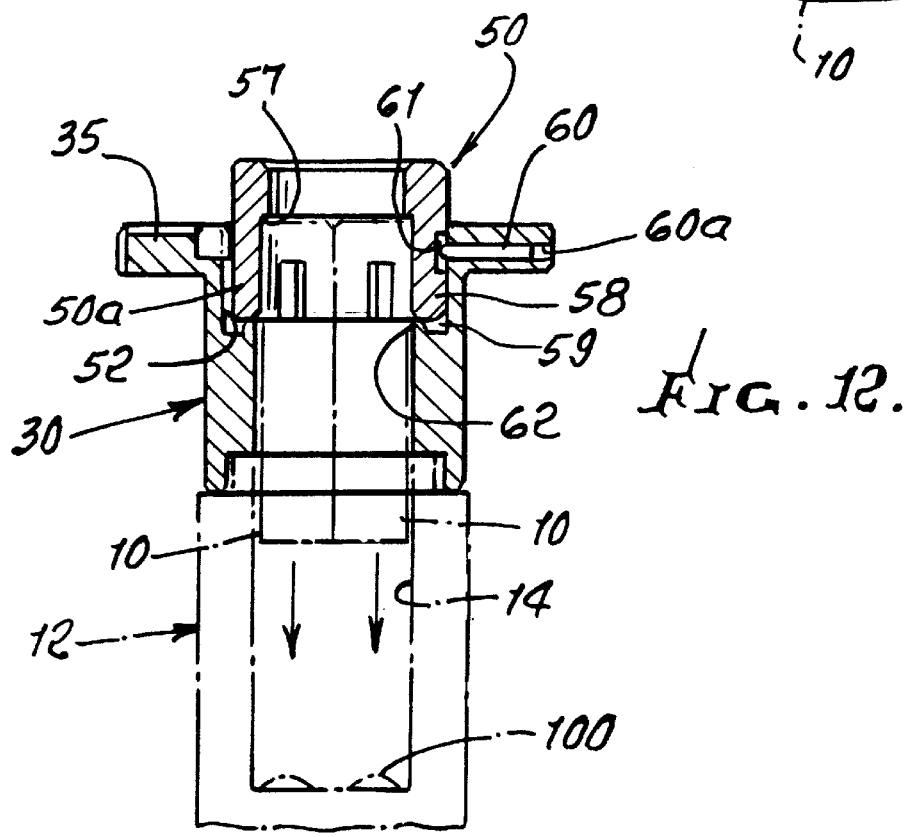
FIG. 12 is a section taken in elevation on lines 12—12 of FIG. 10.
Figure 13:
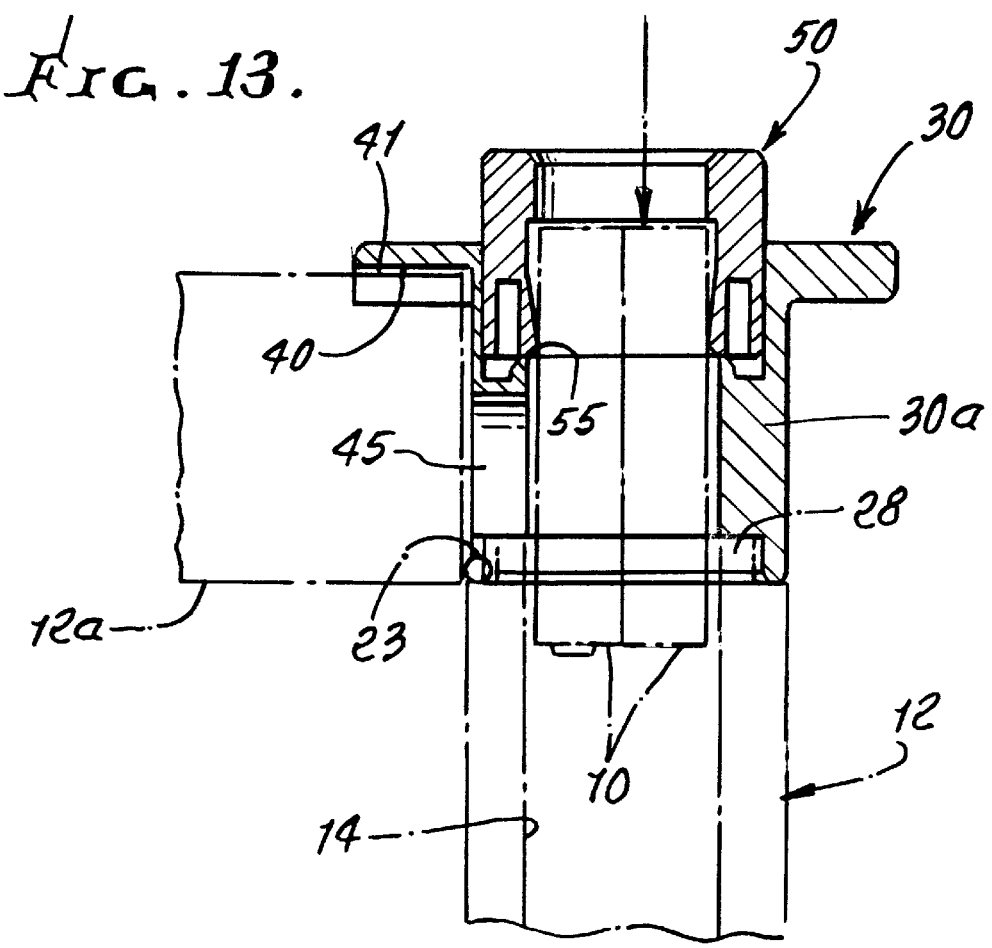
FIG. 13 is a section taken in elevation on lines 13—13 of FIG. 10.

FIG. 3 shows the same elements as in FIG. 1. In addition, a funnel 30 is provided having a central guide opening 31 to receive and guide angularly oriented axial displacement of the pack, or cluster of batteries in the pack, and relative to the funnel. That opening 31 extends in the funnel stem 30a that telescopically fits onto the reduced diameter receptacle protrusion 28, as seen in FIGS. 12 and 13. FIG. 6 shows opening 31 as having four flat sides 31a, and curved corners 31b, to closely receive the corresponding configured battery pack 11. Batteries in the pack appear at 10 in FIG. 3. The method of installation includes the following basic steps:

a) providing a funnel having a guide opening to receive and guide angularly oriented displacement of the cluster of batteries relative to the funnel, b) placing the funnel guide opening into registration with the power supply receptacle, c) and installing the oriented cluster of batteries relatively through the funnel guide opening and into the receptacle.

Preferably, a flange 35 is provided on or integral with the funnel, and manually displaced to angularly or azimuthally orient the opening 31 on the stem 30a with the opening or recess 14 in the receptacle, to facilitate correct angular orientation of the battery pack during insertion down through the funnel, and in relation to electrical terminals 100 in the receptacle, and terminals 18 in the cover 12a, as referred to above. Such funnel correct angular orientation is achieved by providing an arcuate concave recess 40 in the underside of the flange (see FIG. 4), that fits the convex outer surface at 41 of the cover or cap 12a, when the flange is brought into assembled position as seen in FIG. 13, with the funnel stem 30a received onto receptacle protrusion 28. Outer surface portion 41 of the cover may be considered an unusually effective battery aligning or orienting element associated with the receptacle.

An alignment notch 45 is provided in the wall of the funnel stem, to fit over the hinge 23 of the cover connection to the receptacle. See FIG. 13. An alignment stripe or groove 47 is provided on the funnel flange upper surface (see FIG. 5) to align with the stripe 15 on the battery pack, to orient the batteries relative to the funnel and receptacle.

Figure 8:
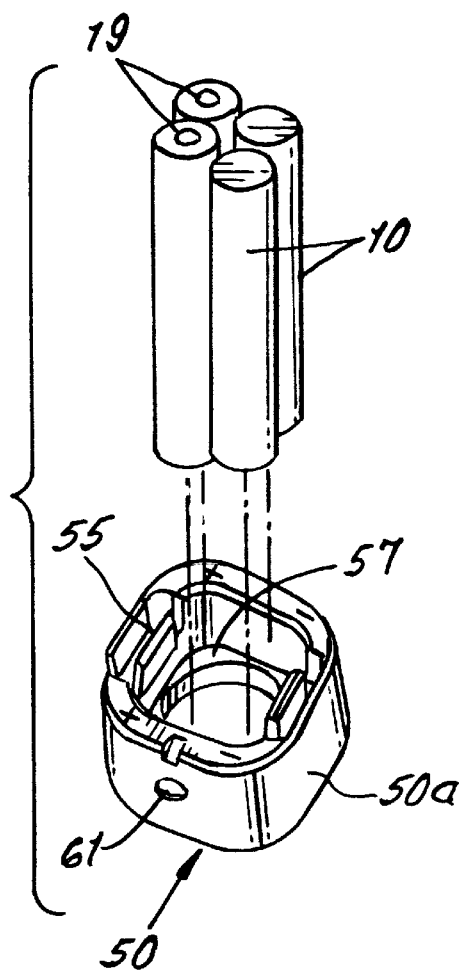
FIG. 8 is an exploded perspective view of a cluster of batteries before their assembly into a cap, which is also shown.
Figure 9:
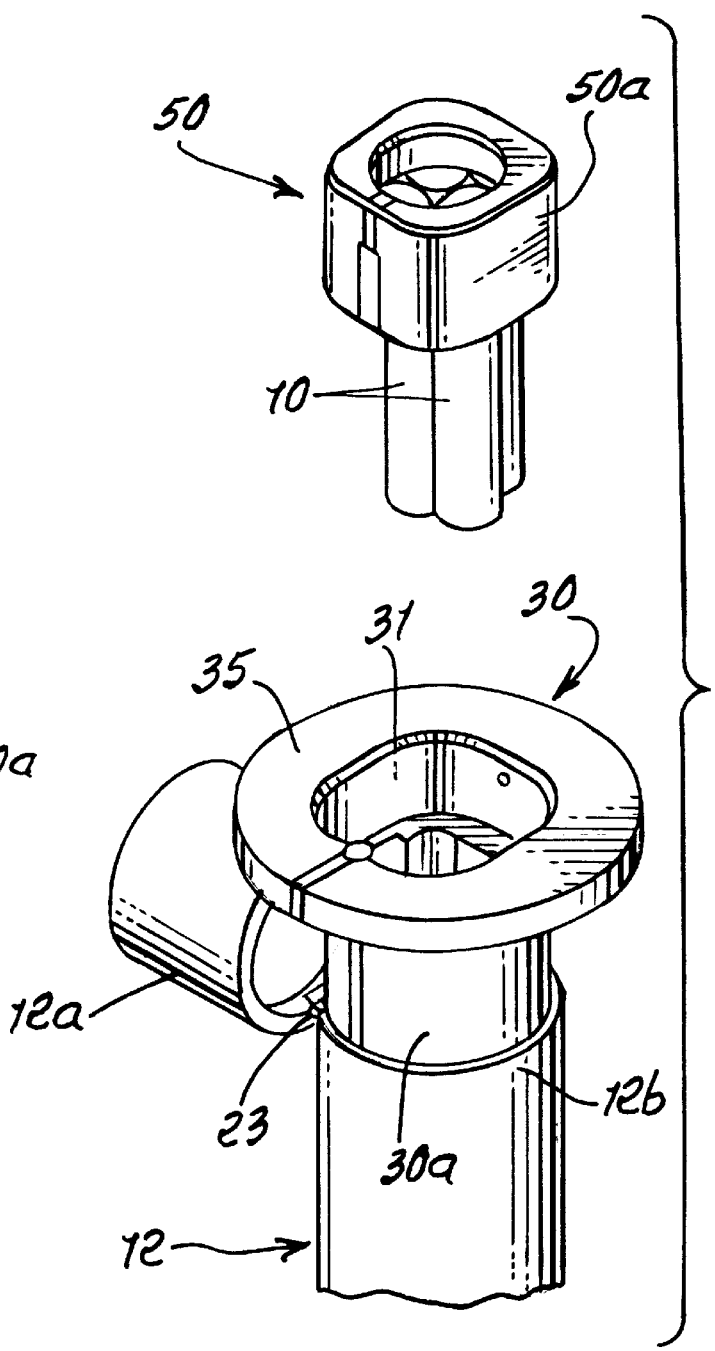
FIG. 9 is an exploded perspective view showing assembly of the cap and batteries into a receptacle, and using a guide funnel.
Figure 10:
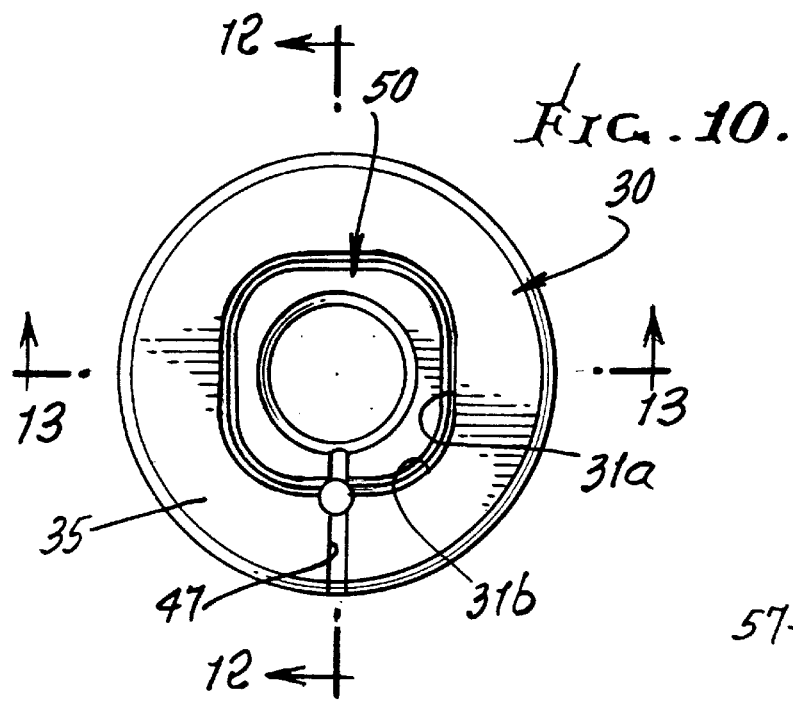
FIG. 10 is a top plan view showing the cap inserted into the funnel.
Figure 11:
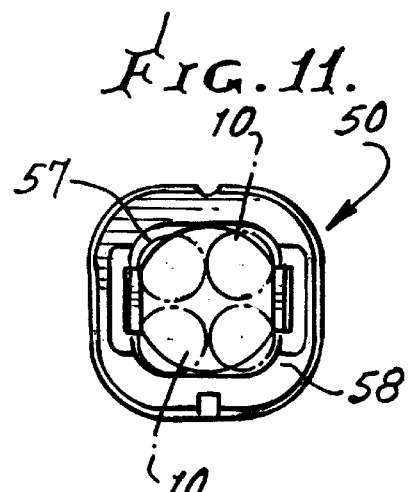
FIG. 11 is a bottom plan view of the cluster of batteries inserted into the cap.

FIGS. 8, 9, and 12 show provision of a battery cluster carrier cap 50 preliminarily employed for endwise interfitting the cluster of four batteries 10, as shown. The cap also interfits the funnel on assembly, so that the batteries are in correct alignment with the funnel guide opening. See FIG. 12 showing cap skirt 50a received in an upper and larger counterbore opening or recess 52 in the funnel. Accordingly, the cap is useful after the batteries are inserted or dropped.

Figure 14:
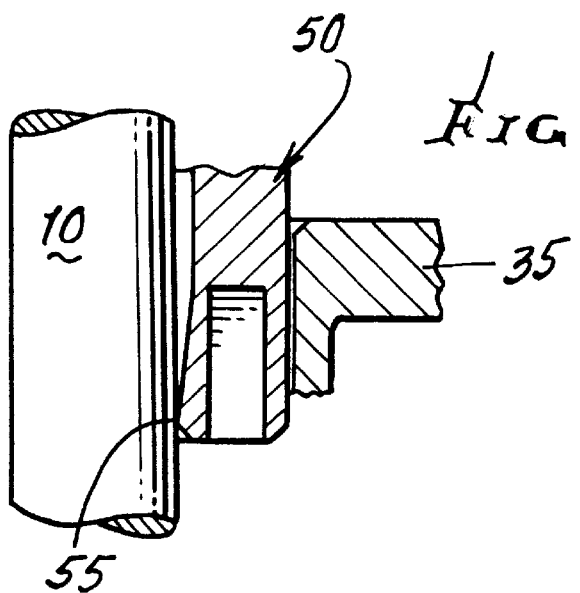
FIG. 14 is an enlarged section showing frictional retention of a battery by the cap.

First structure is provided within the cap to position the batteries relative to the cap during said interfitting of the cluster of batteries and the cap. That first structure is shown as having frictional retention means for exerting retention force sidewardly on the batteries. FIG. 14 shows frictional retention in the form of wedging surfaces 55 engaging the side or sides of a battery or batteries, or of the wrap 11a. That first structure may also include a first ledge 57 within the cap to endwise engage and position the batteries. See FIGS. 12 and 13.

Second structure is also provided within the funnel to position the battery carrier cap relative to the funnel during said interfitting of the cap and funnel. That second structure is shown as a side wall 58 in a recess 59 provided in the funnel, for guiding angularly oriented insertion of the cap into the funnel. See FIG. 12. A detent 60 may be provided in a hole 60a the flange to project radially and interfit a shallow side recess 61 in the cap, to releasably hold the cap in inserted position. Also, this ensures interfit of the cap and funnel. A stop 62 on the funnel endwise engages the cap skirt, to limit its insertion into the funnel.

Once the batteries are inserted, the cap and funnel may be removed, the cover closed onto the end of the receptacle, and the tool is then ready for use. The cap is self-releasing.

What is claimed is:

1. The method of installing a cluster of batteries in a power supply receptacle, that includes a) providing a funnel having a guide opening to receive and guide angularly oriented displacement of the cluster of batteries relative to the funnel, b) placing the funnel guide opening into registration with the power supply receptacle, c) and installing the oriented cluster of batteries through the funnel guide opening and into the receptacle.

2. The method of claim 1 which includes providing a manually angularly oriented flange on the funnel to extend about said opening and move into proximity to an element associated with the receptacle, enabling angularly oriented battery cluster installation.

3. The method of claim 1 including providing a battery cluster carrier cap, endwise interfitting the cluster of batteries and the cap, interfitting the cap and the funnel so that the batteries are in alignment with said funnel guide opening, and allowing displacement of the cluster of batteries endwise from the cap for installation into the receptacle via said guide opening.

4. The method of claim 3 including providing first structure within the cap to position the batteries relative to the cap during said interfitting of the cluster of batteries and the cap.

5. The method of claim 4 wherein said first structure is provided to have frictional retention means for exerting retention force sidewardly on the batteries.

6. The method of claim 5 wherein said frictional retention means is provided to have a sidewardly presented wedging surface or surfaces.

7. The method of claim 4 wherein said first structure within the cap includes a first ledge to endwise engage and position at least one of the batteries in the cluster.

8. The method of claim 4 including providing second structure within the funnel to position the battery carrier cap relative to the funnel during said interfitting of the cap and funnel.

9. The method of claim 8 wherein said second structure is provided to have cap guide means for guiding angularly oriented insertion of the cap into the funnel.

10. The method of claim 9 wherein said second structure within the funnel includes a stop to endwise engage the cap and limit its insertion into the funnel.

11. The method of claim 1 wherein said receptacle is provided as part of a rotary tool and motor assembly and wherein the batteries supply electrical current to the motor.

12. The method of claim 11 wherein the rotary tool is a surgical screwdriver.

13. The method of claim 2 wherein said element is provided to comprise a cover carried by the receptacle to be moved into receptacle covering position, after the batteries are installed into the receptacle, and the funnel is removed, the cover hinged to the receptacle to maintain angular orientation about the receptacle axis so as to orient the funnel, when the cover is open.

14. The method of claim 1 wherein said cluster of batteries is provided in the form of a sterile pack, receivable by the funnel.

15. The method of claim 13 including providing an alignment marker on the funnel to register with a corresponding alignment marker on the cover.

16. The method of claim 3 including providing alignment markers on the cap and funnel to enable their registration during insertion of the cap into the funnel.

17. The method of installing multiple batteries in a pack into a power supply receptacle, having a cover, the pack having substantially flat sides, that includes
   a) providing said receptacle to have a battery pack receiving recess, the recess having substantially flat sides to correspond to the pack sides, and providing a guide funnel associated with said receptacle,
   b) providing markers on the battery pack and on the receptacle, and relatively angularly orienting said markers by relatively angularly orienting the pack and receptacle,
   c) and endwise inserting the pack into the recess and via said guide funnel.

18. The method of claim 17 including providing a cover on the receptacle swingable between open and closed positions; and positioning the marker on the receptacle to be covered by the cover in its closed position.

19. The method of claim 1 including providing said cluster of batteries to comprise four batteries retained by a holder having four substantially flat sides.

20. The method of claim 17 including providing said multiple batteries to comprise only four batteries in a cluster wherein each battery extends in sideward proximity to two others of the batteries.

21. Apparatus to facilitate installation of a cluster of batteries in a power supply receptacle, comprising in combination
   a) a funnel having a guide opening to receive and guide angularly oriented displacement of the cluster of batteries relative to the funnel,
   b) said funnel guide opening being registrable with the power supply receptacle,
   c) whereby the cluster of batteries is then installable through the funnel guide opening and into the receptacle.

22. The combination of claim 21 including a manually angularly oriented flange in the funnel to extend about said opening and move into proximity to an element associated with the receptacle, enabling angularly oriented battery cluster installation.

23. The combination of claim 21 including a battery cluster carrier cap for endwise interfitting the cluster of batteries and the cap, interfitting the cap and the funnel so that the batteries are in alignment with said funnel guide opening, and allowing displacement of the cluster of batteries endwise from the cap for installation into the receptacle via said guide opening.

24. The combination of claim 23 including providing first structure within the cap to position the batteries relative to the cap during said interfitting of the cluster of batteries and the cap.

25. The combination of claim 24 wherein said first structure is provided to have frictional retention means for exerting retention force sidewardly on the batteries.

26. The combination of claim 25 wherein said frictional retention means is provided to have a sidewardly presented wedging surface or surfaces.

27. The combination of claim 24 wherein said first structure within the cap includes a first ledge to endwise engage and position at least one of the batteries in the cluster.

28. The combination of claim 24 including second structure within the funnel to position the battery carrier cap relative to the funnel during said interfitting of the cap and funnel.

29. The combination of claim 28 wherein said second structure is provided to have cap guide means for guiding angularly oriented insertion of the cap into the funnel.

30. The combination of claim 29 wherein said second structure within the funnel includes a stop to endwise engage the cap and limit its insertion into the funnel.

31. The combination of claim 21 wherein said receptacle is provided as part of a rotary tool and motor assembly and wherein the batteries supply electrical current to the motor.

32. The combination of claim 31 wherein the rotary tool is a surgical screwdriver.

33. The combination of claim 22 wherein said element is provided to comprise a cover carried by the receptacle to be moved into receptacle covering position, after the batteries are installed into the receptacle, and the funnel is removed, the cover hinged to the receptacle to maintain angular orientation about the receptacle axis so as to orient the flange, when the cover is opened.

34. The combination of claim 21 wherein said cluster of batteries is provided in the form of a sterile pack, receivable by the funnel.

35. The combination of claim 21 including an alignment marker on the funnel to register with a corresponding alignment marker on the cover.

36. The combination of claim 23 including alignment markers on the cap and funnel to enable their registration during insertion of the cap into the funnel.

37. The method of inserting batteries into a receptacle associated with a surgical instrument, that includes
   a) providing a cover for the receptacle, attached to the receptacle, the cover having an open position,
   b) providing a guide to assist said inserting,
   c) and, when the cover is open, angularly orienting the guide relative to the open cover, to angularly orient said inserting.

38. The method of claim 30 wherein said angular orienting includes providing angular orientation means on the guide and cover, and registering said means.

39. The method of claim 17 including providing a receptacle cover having an open position in which the cover angularly orients the guide funnel relative to the receptacle.

* * * * *